United States Patent Office 3,256,225
Patented June 14, 1966

3,256,225
VICINAL ACRYLOXY HYDROXY LONG CHAIN FATTY COMPOUNDS AND POLYMERS THEREOF
Charles S. Nevin, Decatur, Ill., assignor to A. E. Staley Manufacturing Company, Decatur, Ill., a corporation of Delaware
No Drawing. Filed Jan. 24, 1962, Ser. No. 168,540
22 Claims. (Cl. 260—23)

This application is a continuation-in-part of application Serial No. 119,339, filed June 26, 1961, which is a continuation-in-part of application Serial No. 800,071, filed March 8, 1959, now abandoned.

The present invention relates broadly to copolymers of vicinal acryloxy-hydroxy long chain aliphatic compounds with ethylenically unsaturated monomers. These acryloxy-hydroxy long chain compounds are characterized by two structural features: (1) at least one long aliphatic chain having from 10 to 24 carbon atoms, and (2) at least one hydroxy alkyl ester grouping represented by the following formula:

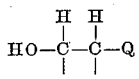

In the above formula, Q is an acryloxy radical, and the linked pair of carbon atoms is a segment of a characterizing long aliphatic fatty chain.

An important object of the invention is the provision of novel addition copolymers of acryloxy long chain aliphatic compounds with ethylenically unsaturated monomers.

Another object of the invention is the provision of novel addition copolymers of vicinal acryloxy-hydroxy substituted glycerides and other long chain fatty acid esters with vinylidene monomers, such as methacrylic acid, acrylic acid, styrene, vinyl toluene, methyl methacrylate, etc.

The copolymerizable vicinal acryloxy-hydroxy monomers of this invention can be represented by the following structure:

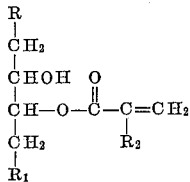

wherein

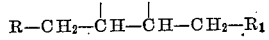

is an aliphatic open chain of from 10 to 24 carbon atoms; R and $R_1$ are independently hydrogen or a monovalent aliphatic group; $R_2$ is hydrogen, an alkyl group of from 1 to 4 carbon atoms, halogen, cyano,

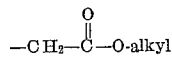

phenyl, or benzyl. These monomers can be prepared by reacting an epoxidized fatty material having the structure

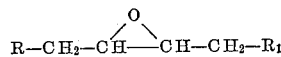

and an acid acrylic compound having the structure

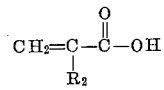

(wherein R, $R_1$ and $R_2$ are defined above) in the presence of a polymerization inhibitor.

The vicinal acryloxy-hydroxy monomers of the present invention may contain more than one long aliphatic chain and/or more than one vicinal acryloxy-hydroxy group. An example containing multiple long chains and multiple acryloxy-hydroxy groups is obtained by fully epoxidizing a triglyceride containing three unsaturated long chain acyl groups and then acylating the product with a slight excess of acrylic acid. Compounds of this type are particularly useful for preparing cross-linked copolymers of monovinylidene monomers.

The vicinal acryloxy-hydroxy monomers also may contain epoxy groups, ethylenic unsaturation

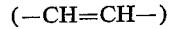

and halogen substituents in the long aliphatic chains. The presence of the first two substituents in the new compounds, singly or together, is made conveniently possible by means of the foregoing general method of preparation. Unsaturation remains if the unsaturated material is not fully epoxidized; epoxy groups remain if the acylation is incomplete. Both will occur in the final product if incomplete epoxidation is followed by incomplete acylation of the epoxy groups. Halogen, e.g., chlorine, may be readily introduced by addition to the residual ethylenic double bonds. It may be convenient at times to use this means to eliminate residual ethylenic unsaturation in the new compounds.

In somewhat greater detail R and $R_1$ can contain various other groups such as hydroxyl groups, carboxyl groups, carboxylate groups, carbamyl groups, amino groups, nitrilo groups, carbamato groups, halo groups, aryloxy groups, mercapto groups, alkoxy groups, acyloxy groups etc. The preferred long-chain epoxy compounds, from which the long chain acryloxy-hydroxy monomers of this invention are formed, are the readily available epoxidized glyceride oils, which are considered as having carboxylate groups, such as epoxidized soybean oil, epoxidized corn oil, epoxidized castor oil, epoxidized cottonseed oil, epoxidized hempseed oil, epoxidized safflower oil, epoxidized peanut oil, epoxidized linseed oil, epoxidized olive oil, epoxidized cod oil, epoxidized herring oil, epoxidized menhaden oil, etc. Epoxidized esters of other unsaturated long-chain acids are also advantageous starting materials, such as the methyl ester of 9,10-epoxystearic acid, the 2-ethylhexyl ester of 9,10-12,13-diepoxystearic acid, the phenyl ester of 5,6-epoxycapric acid, epoxidized tall oil fatty acid esters, etc. It may be theorized that some of the thermosetting characteristics of copolymers based on these long chain monomers formed from polyepoxy long-chain compounds may be accounted for by ether groups bridging 2 or more of the fatty molecules during the acylation of the polyepoxy compound.

The following are representative of some of the epoxy compounds which can be used to prepare the monomers in this invention: 4,5-epoxydecane; 9,10-epoxyoctadecane; 9,10-epoxytetracosane; 8,9-epoxy-1 hydrovydecane; 9,10-epoxy-1-hydroxy-octadecane; 9,10-epoxy-6-hydroxy-tetracosane; 4,5-epoxy-1-chlorodecane; 9,10-epoxy-1-bromooctadecane; 9,10-epoxy-1-chlorotetracosane; 4,5-epoxy-1-nitrilodecane; 9,10-epoxy-1-nitrilooctadecane; 9,10-epoxy-1-nitrilotetracosane; 4,5-epoxy - 1-aminodecane; 9,10-epoxy - 1-methylaminooctadecane; 9,10-epoxy - 1-dioctylaminotetracosane; 4,5-epoxy - 1-carbamyldecane; 9,10-epoxy-N-ethyl-1-carbamyloctadecane; 9,10-epoxy-N-dioctyl-1-carbamyltetracosane; 9,10-epoxycapric acid; 9,10-epoxystearic acid; 9,10-epoxyricinoleic acid; 9,10-epoxytetracosic acid; 4,5-epoxydecyl-1-acetate; 9,10-epoxystearyl stearate; 9,10-epoxy-1-phenoxyoctadecane; 9,10-epoxy-1-propoxyoctadecane; etc.

When R in the preceding formula is substituted by a carboxylate group, the substituent can be represented by the formula

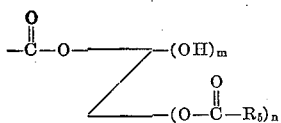

wherein Z is the residue of a hydroxyl compound; $m$ is a number ranging from 0 to 5; $n$ is a number ranging from 0 to 5; the sum of $m$ and $n+1$ is 1 to 6, said sum corresponding to the number of hydroxyl groups in the original hydroxyl compound; and each $R_5$ is independently a group selected from the group consisting of hydrogen, monovalent aliphatic groups having from 1 to 24 carbon atoms, and monovalent aromatic groups having from 6 to 18 carbon atoms.

The alcohols from which the foregoing parent esters may be derived thus contain from 1 to 6 hydroxyl groups and from 1 to 24 carbon atoms. They may be saturated or ethylenically unsaturated. They may be open-chain compounds such as n-butanol, glycerol, and sorbitol, or cyclic compounds such as furfuryl alcohol, cyclohexanol, and inositol. Among the suitable alcohols for this purpose are the monohydric alcohols ranging from methyl to lignoceryl, including the many possible isomers in which the hydroxyl groups are primary, secondary, or tertiary. Among the many suitable dihydric alcohols are ethylene glycol, methylene glycol, and the polyoxyalkylene glycols having 1 to 3 carbon atoms in each oxyalkylene group, i.e., the polymethylene glycols, the polyethylene glycols, and the polypropylene glycols. Additional suitable higher polyhydric alcohols are pentaerythritol, arabitol, trimethylolethane, and trimethylolpropane.

Suitable parent esters may also be obtained from the unsaturated long chain acids and aromatic hydroxy compounds such as phenol, the cresols, and resorcinol.

Included by the present invention are acryloxy-hydroxy esters wherein the parent ester consists of a polyhydric alcohol only partially acylated with a long chain carboxylic acid. Examples of this are the products obtained by carefully epoxidizing monoglycerides and diglycerides containing a suitable unsaturated long chain acyl group and then esterifying the epoxy compounds with the acrylic acids. Also included by the invention are acryloxy-hydroxy esters wherein the parent ester is derived from polyhdric alcohols, acylated in part by other acids. For example, the glyceryl hydroxy groups in the foregoing monoglycerides and diglycerides may be esterified with acetic acid, stearic acid, etc.

In accordance with the present invention, an essential feature of the characterizing groups in these long chain fatty monomers is the presence of a readily addition-polymerizable acryloxy group. Examples of acylating acid acrylic compounds which furnish the required acryloxy radicals are acrylic acid, methacrylic acid, alpha chloroacrylic acid, alpha cyanoacrylic acid, alpha benzylacrylic acid, atropic acid, methyl acid itaconate, and stearyl acid itaconate.

The physical and chemical characteristics of the new copolymers contemplated by this invention can be altered substantially by choice of the acylating acid, by the degree or extent of acylation with the acid acrylic compound, and by choice of comonomer or comonomers. The latter ethylenically unsaturated comonomers include an alkyl ester of alpha, beta-ethylenically unsaturated monocarboxylic acids, for example methyl methacrylate, ethyl acrylate, butyl methacrylate, and stearyl acrylate; alpha, beta-ethylenically unsaturated monocarboxylic acids, for example acrylic acid and methacrylic acid; monovinyl aromatics, for example styrene and vinyl toluene; allyl alcohol; vinyl esters such as vinyl acetate and vinyl stearate; acrylonitrile, butadiene, and the like; or unsaturated compounds such as maleic acid, crotonic acid, cinnamic acid, dipentene, myrcene, and the like. The resulting copolymers range from viscous liquids through soft gels to tough rubbery products and hard resins. While any of the readily polymerizable alpha, beta-ethylenically unsaturated monomers can comprise from 2 to 98 parts by weight of the polymerizable monomers in the polymerizable composition, and correspondingly the vicinal acryloxy-hydroxy compounds comprise 98 to 2 parts by weight, it is usually preferable to use a monovinyl aromatic, particularly styrene, in a concentration of from about 10 to 70 parts by weight of the polymerizable monomers in the composition because of its low cost, ease of polymerization and the overall characteristics, particularly strength, of the resulting copolymers. Methyl methacrylate, while somewhat more expensive than styrene, gives about the same physical properties in the same weight percent. Preferably the vicinal acryloxy-hydroxy long chain compounds comprise from about 30 to 80 parts by weight of any copolymerizable monomeric material in order to give the resultant copolymer the best balance of strength and flexibility.

Residual unreacted acid acrylic compound may be present in the new products of this invention. If present during subsequent polymerization, it copolymerizes with any polymerizable ethylenically unsaturated material to form homogeneous products. If desired, however, the residual acid acrylic compound may be removed by vacuum distillation, solvent extraction, or by contact with an acid adsorbing resin.

Generally, it is preferred that any residual acid acrylic compound, especially when it is either acrylic acid or methacrylic acid, be left in the polymerizable composition. In some cases this residual acid may be suplemented with additional acrylic acid or methacrylic acid since it is usually desirable to have one of these acids comprise from about 2 to 30 parts by weight of the polymerizable material (at least 5% by weight of the vicinal acryloxyhydroxy compound). In addition to the ease of copolymerization, acrylic acid and methacrylic acid enhance the physical characteristics, most notably the hardness, of the resultant copolymers, particularly when no methyl methacrylate or monovinyl aromatic such as styrene and vinyl toluene, is present in the copolymerizable composition. A particularly preferred class of copolymers results from the free-radical bulk polymerization of from 2 to 30 parts by weight of a compound having the formula

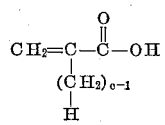

wherein $c$ is a number from 1 to 2; from 10 to 70 parts by weight of either styrene, vinyl toluene, methyl methacrylate, or mixtures therof; and from 30 to 80 parts by weight of a vicinal acryloxyhydroxy long-chain fatty acid ester of a polyhydric alcohol, most particularly an ester of a glyceride oil, wherein said acryloxy group has the structure:

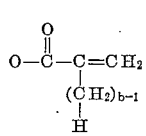

and $b$ is a number of from 1 to 2. Styrene and vinyl toluene may be represented by the structure:

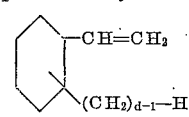

wherein $d$ is a number from 1 to 2.

The vicinal acryloxy-hydroxy compounds of this invention can be copolymerized at a temperature of from 0° C. to 250° C. with any of the aforementioned vinylidene compounds. The polymerization can be carried out by reacting the addition polymerizable monomers in the presence of a free-radical catalyst in bulk, solution, suspension, or emulsion. Typical free radical catalysts, which include the peroxidic catalysts, such as hydrogen peroxide, acetyl peroxide, methyl ethyl ketone peroxide, tertiary butyl hydroperoxide, potassium persulfate, benzoyl peroxide, etc., and azo catalysts such as azobisisobutylonitrile, etc., can be used in a concentration of from 0.01% to 10% by weight of the reactants. Accelerators (or driers), such as cobalt naphthenate, cobalt octoate, dimethyl aniline, etc., are particularly useful for room temperature cures with the various peroxidic catalysts, particularly methyl ethyl ketone peroxide and benzoyl peroxide, in a concentration of 0.01% to 5% by weight of the reactants. Surprisingly, many of the copolymers of this invention, which have been prepared in the presence of dimethyl aniline, are color stable in outdoor weathering tests.

The copolymers are useful broadly as protective coatings, textile and paper additives and sizing agents, laminating resins, potting resins, adhesives, etc. They are also useful in the manufacture of cast and extruded objects. The long fatty chains of the vicinal acryloxy-hydroxy monomers makes them particularly well-suited as internal plasticizers of various copolymers of monomers such as styrene and vinylidene chloride. In these cases where the copolymers contain residual epoxy groups, the resultant copolymer may also be stabilized internally.

It will be apparent from the foregoing description that the acryloxy-hydroxy long chain aliphatic comonomers of the present invention have one or more vicinal acryloxy-hydroxy groups and one or more of the characteristic long chain alkyl groups. The invention contemplates copolymers of (1) the separate molecular species of the defined vicinal acryloxy-hydroxy long chain aliphatic compounds, (2) mixtures of such molecular species, and (3) the separate or mixed species together with compatible unreacted starting materials and/or compatible side-reaction products thereof.

The following examples illustrate may invention and describe convenient methods of preparing new compounds which are specific embodiments of my invention. In the following example "parts" refers to parts by weight.

Example 1

A mixture of 25.0 grams (0.10 equivalent of oxirane oxygen) of epoxidized soybean oil and 7.2 grams (0.10 equivalent of carboxyl) of acrylic acid (inhibited with 0.0072 gram of monomethyl ether of hydroquinone) was heated with mixing under reflux for one hour at 125° C. and then cooled to room temperature. The cooled product was a viscous liquid which contained 2.13% oxirane oxygen (42% of the original content) and 1.42 milliequivalents/gram of acid (46% of the original acrylic acid). After being mixed with 1% benzoin and exposed to sunlight for two hours, the product which contained 10.4% by weight residual acrylic acid polymerized to a clear, pale yellow, fairly tough, pliable solid.

Example 2

A mixture of 25.0 grams (0.1 equivalent of oxirane oxygen) of epoxidized soybean oil and 21.6 grams (0.3 equivalent of carboxyl) of acrylic acid (inhibited with 0.0216 gram of monomethyl ether of hydroquinone) was heated with mixing under reflux for one hour at 125° C. and then cooled to room temperature. The cooled product, a viscous liquid, was transferred to a separatory funnel and diluted with ethyl ether. It was washed a number of times, first with aqueous 1% NaHPO$_4$, and then with aqueous 1% NaCl until free of acidity, and dried under vacuum by warming. The product was a highly-viscous oil which analyzed as follows:

| | |
|---|---|
| Acid value (mg. KOH/g.) | 6.0 |
| Saponification value (mg. KOH/g.) | 295 |
| Oxirane oxygen (percent) | 0.20 |
| Hydroxyl value (mg. KOH/g.) | 145 |

Infrared absorption spectrophotometry showed no evidence for the oxirane oxygen structure. The acrylate ester structure was very pronounced, but there was no absorption band for free acrylic acid. The most outstanding absorption was that due to the presence of hydroxyl groups. A small portion of the product was polymerized to a clear, tough, fairly hard solid by adding 1% benzoin and exposing it to sunlight for several hours. Another portion was heated at 60° C. for 12 hours with benzoyl peroxide as a catalyst. The polymer had an elastic modulus in torsion of 40,000 p.s.i. at 0° C. which dropped to 10,000 p.s.i. at 20° C. and 2,000 p.s.i. at 60° C. A third portion was copolymerized with an equal weight of styrene by heating at 60° C. for 12 hours using benzoyl peroxide as a catalyst. This clear, hard, slick-surfaced polymer had an elastic modulus in torsion of 222,000 p.s.i. at 40° C. which fell to 10,000 p.s.i. at 60° C.

Example 3

A mixture of 19.5 grams (0.05 equivalent of oxirane oxygen) of epoxidized soy fatty acid 2-ethylhexyl esters and 4.3 grams (0.05 equivalent of carboxyl) of methacrylic acid (inhibited with 0.0043 gram of hydroquinone) was heated slowly with stirring for about ten minutes under reflux to 168° C. and then cooled to room temperature. The cooled product was a yellow, fluid liquid containing 2.4% oxirane oxygen (70% of the original content). By adding 1% benzoin to a portion of the product and exposing it to sunlight, a soft, almost wax-like polymer was formed. By adding 25% methyl methacrylate to another portion of the product and polymerizing as before, a much tougher, elastic solid was formed. The addition of 20% butyl methacrylate to a third portion of the product followed by polymerization gave a very clear, tough, rubber-like solid.

Example 4

Two hundred and fifty grams (1.0 equivalent of oxirane oxygen) of epoxized soybean oil was heated to 125° C. To this was added 86 grams (1.0 equivalent of carboxyl) of methacrylic acid inhibited with 0.172 gram of hydroquinone. The mixture was heated at 125° C. for 0.75 hour, then at 150° C. for two hours and then cooled to room temperature. The viscous product analyzed as follows:

| | |
|---|---|
| Acid value (mg. KOH/g.) | 73 |
| Saponification value (mg. KOH/g.) | 291 |
| Oxirane oxygen (percent) | 0.48 |
| Hydroxyl value (mg. KOH/g.) | 145 |

By adding 1% benzoyl peroxide to the product which contained 11.2 percent by weight residual methacrylic acid and heating it at 60° C. for six hours, a fairly hard and tough, slightly pliable, clear, pale yellow polymer was formed. It had an elastic modulus in torsion at 140,000 p.s.i at 40° C. which decreased to 10,000 p.s.i. at 140° C. A 50:50 copolymer of the above reaction product with methyl methacrylate was formed under the above conditions. It had an elastic modulus in torsion of 300,000 p.s.i. at 40° C. which decreased to 10,000 p.s.i. at 90° C. A 50:50 copolymer of the above reaction product with styrene formed under the same conditions was a very hard, tough, clear, pale yellow solid.

Example 5

A mixture of 50 grams (0.2 equivalent of oxirane oxygen) of epoxidized soybean oil and 28.8 grams (0.2 equivalent of carboxyl) of monomethyl itaconate was heated for 1.25 hours with stirring to 170° C. and then cooled to room temperature. The cooled product was a viscous liquid containing 0.05% oxirane oxygen (1% of the orginal content) and 0.96 milliequivalent/gram of acid (38% of the original content). After adding 1% benzoin to the product which contained 13.8% by weight monomethyl itaconate and exposing it to sunlight, the product polymerized to a clear, fairly hard, pliable solid. By adding 1% benzoyl peroxide to a part of the product and heating it at 65° C. for 4.5 hours, a much harder, less pliable, clear solid polymer was obtained.

Example 6

A slurry of 0.09 gram (0.0014 mole) of zinc dust in 244 grams (1.0 mole of oxirane oxygen) of epoxidized soybean oil was prepared. Then 0.192 gram of monomethyl ether of hydroquinone (MEHQ) was dissolved in 129 grams (1.5 moles) of methacrylic acid (inhibited with 0.025% MEHQ) and added to the epoxidized soybean oil. The mixture was heated with agitation to 128–130° C. and maintained at this temperature for 1.5 hours. The following data were obtained on the cooled liquid product:

| | |
|---|---|
| Free methacrylic acid, wt. percent | 20.0 |
| Oxirane oxygen, wt. percent | 0.25 |
| Saponification value, meq./g. | 6.00 |
| Refractive index, $n_D^{45}$ | 1.4640 |
| Density, $d_4^{35}$ | 1.035 |
| Viscosity, poise @ 25° C. | 28.0 |

A portion of the product was cured to a clear, pale-yellow, tough, pliable polymer by incorporating 1% benzoyl peroxide and heating at 60° C. for 16 hours. By copolymerizing a portion under similar conditions with 33.3% styrene a tougher, harder, more rigid product was formed.

Example 7

A slurry of 0.045 gram (0.0007 mole) of zinc dust in 182 grams (0.50 mole of oxirane oxygen) of epoxized tall oil fatty acid isooctyl esters was prepared. Then 0.132 gram of MEHQ was dissolved in 64 grams (0.75 mole) of methacrylic acid (inhibited with 0.025% MEHQ) and added to the epoxized soybean oil. The mixture was heated with stirring at 128°–130° C. for 2.5 hours. The following data were obtained on the cooled product:

| | |
|---|---|
| Freemethyacrylic acid, meq./g. | 1.88 |
| Oxirane oxygen, meq./g. | 0.47 |
| Saponification value, meq./g. | 4.69 |

To 10.0 grams of the clear, yellow liquid product which contained 16.2% by weight residual methacrylic acid, 3.3 grams of styrene and 0.1 gram of benzoyl peroxide were added. By heating at 100° C. for 2 hours, a very tough, flexible, clear thermoset polymer was formed.

Example 8

A mixture of 25.00 grams (53 millimoles of oxirane oxygen) of epoxidized soybean oil fatty acid monoglyceride, 6.88 grams (80 millimoles) of methacrylic acid (inhibited with 0.025% MEHQ), 0.01 gram of p-methoxy-phenol was heated with stirring and air sparging at 125° C. for 2.5 hours. The cooled product analyzed 0.71 meq./g. oxirane oxygen and 1.55 meq./g. acid (indicating 55% methacrylation). By adding 1% benzoyl peroxide to a portion of the product which contained 13.33% by weight residual methacrylic acid and heating at 115° C. for one hour, a clear, tough, pliable polymer was formed. Similarly, by curing a mixture of the product and 33 wt. percent styrene at 115° C. for one hours with 1% benzoyl peroxide, a clear, tough, pliable copolymer was formed.

Example 9

A mixture of 20.00 grams (54 millimoles of oxirane oxygen) of epoxidized soybean oil fatty alcohol, 6.95 grams (81 millimoles) of methacrylic acid (inhibited with 0.027 MEHQ), 0.63 gram (0.5 millimole) of zinc dust, and 0.027 gram (0.1% wt. percent total mixture) of p-methoxyphenol was heated with stirring and air sparging at 125° C. for 1.5 hours. Analyses of the cooled product indicated 52% methacrylation of the fatty alcohol.

| | Meq./g |
|---|---|
| Free methacrylic acid | 1.51 |
| Saponification value | 1.08 |
| Oxirane oxygen | 0.79 |

One percent benzoyl peroxide was added to a portion of the liquid product which contained 13% by weight free methacrylic acid. The product was then heated at 75° C. for five hours. A fairly tough, clear, pale yellow, pliable polymer was formed.

Example 10

A solution of 0.344 gram (0.06 wt. % total mixture) of MEHQ in 86 grams (1.0 mole) of methacrylic acid was added to a mixture of 0.141 gram (0.0022 mole) of zinc dust in 488 grams (2.0 moles of oxirane oxygen) of epoxidized soybean oil. The reactants were heated with stirring and air sparging at 125° C. for 1.5 hours. After cooling to room temperature, the product analyzed as follows:

| | |
|---|---|
| Free methacrylic acid, wt. percent | 5.80 |
| Oxirane oxygen, wt. percent | 2.77 |
| Saponification value, meq./g. | 4.19 |

A small portion of this clear, viscous liquid product was heated with 1% benzoyl peroxide at 100° C. for 2.5 hours to form a clear, very flexible, fairly soft thermoset polymer. The polymer had an elastic modulus in torsion of 10,000 p.s.i. at −3° C.

The results of the next five examples are displayed in Table 1.

Example 11

One hundred and fifty parts of the reaction product prepared by the method of Example 6 (20% by weight free methacrylic acid) and 75 parts of styrene were polymerized at 150° F. for 4 hours in the presence of 2.25 parts of benzoyl peroxide and then post-cured at 220° F. for 1 hour.

Example 12

One hundred and fifty parts of the reaction product prepared by the method of Example 6 (20% by weight free methacrylic acid), 71 parts styrene, and 4 parts divinyl benzyne were polymerized at 150° F. for 4 hours using 2.25 parts of benzoyl peroxide and then post-cured at 220° F. for 1 hour.

Example 13

One hundred and fifty parts of the reaction product prepared by the method of Example 6 (20% by weight free methacrylic acid), 67 parts styrene, and 8 parts divinyl benzene were polymerized at 150° F. for 4 hours using 2.25 parts of benzoyl peroxide and then post-cured at 220° F. for 1 hour.

Example 14

One hundred and fifty parts of the reaction product prepared by the method of Example 6 (20% by weight free methacrylic acid), 56 parts styrene, and 19 parts vinyl toluene were polymerized at 150° F. for 4 hours using 2.25 parts of benzoyl peroxide and then post-cured at 220° F. for 1 hour.

Example 15

One hundred and fifty parts of the reaction product prepared by the method of Example 6 (20% by weight free methacrylic acid) and 75 parts vinyl toluene were polymerized at 150° F. for 4 hours using 2.25 parts of benzoyl peroxide and then post-cured at 220° F. for 1 hour.

TABLE I

| Example | 11 | 12 | 13 | 14 | 15 |
|---|---|---|---|---|---|
| Flexular Strength in p.s.i. | 11,600 | 11,700 | 9,700 | 11,200 | 11,100 |
| Flexular Modulus in p.s.i. | 321,000 | 310,000 | 264,000 | 319,000 | 300,000 |
| Thickness in inches | 0.121 | 0.146 | 0.126 | 0.118 | 0.119 |
| Tensile strength in p.s.i. | 7,600 | 7,290 | 6,300 | 7,360 | 7,440 |
| Tensile Modulus in p.s.i. | 305,000 | 280,000 | 228,000 | 273,000 | 249,000 |
| Percent Elongation | 8.3 | 6.8 | 6.0 | 6.8 | 6.9 |
| Initial Barcol 934-1 Hardness | 13 | 15 | 12 | 13 | 20 |
| 10-sec. Barcol 934-1 Hardness | 9 | 10 | 6 | 6 | 14 |
| Clash-Berg $T_4$, ° C. | 94 | 92 | 96 | 90 | 90 |
| Heat Distortion Temperature at 66 p.s.i in ° C. | 82 | 85 | 83 | 81 | 77 |
| Heat Distortion Temperature at 264 p.s.i. in ° C. | 67 | 66 | 64 | 66 | 63 |

*Example 16*

Twenty parts methacrylamide were dissolved at 170° F. in 180 parts of the reaction product prepared by the method of example 6 (20% by weight free methacrylic acid) and cooled. After 100 parts of styrene and 3 parts benzoyl peroxide were added to the above, the composition was polymerized at 150° F. for 16 hours and post-cured at 220° F. for 1 hour. The results of this and the next example are shown in Table II.

*Example 17*

Example 16 was repeated except that acrylamide was substituted for methacrylamide.

TABLE II

| | Example 16 | Example 17 |
|---|---|---|
| Flexular Strength in p.s.i. | 13,700 | 13,800 |
| Flexular modulus in p.s.i. | 379,000 | 350,000 |
| Tensile strength in p.s.i. | 8,700 | 9,200 |
| Tensile modulus in p.s.i. | 332,000 | 320,000 |
| Percent Elongation | 5.4 | 6 |
| Barcol 934-1 hardness | 28-21 | 30-24 |
| Clash-Berg $T_4$ in ° C. | 108 | 112 |

*Example 18*

Two parts of the reaction product prepared by the method of Example 6 (20% by weight free methacrylic acid) and 1 part acrylonitrile were polymerized isothermally for 7 hours at 25° C. using 1% by weight benzoyl peroxide and 0.1% by weight dimethyl aniline as the catalyst. The copolymer had a 56° C. heat distortion temperature at 66 p.s.i.

*Example 19*

Two parts of the reaction product prepared by the method of Example 6 (20% by weight free methacrylic acid) and 1 part ethyl acrylate were polymerized isothermally for 4.5 hours at 25° C. using 1% by weight benzoyl peroxide and 0.1% by weight dimethyl aniline as the catalyst. The copolymer had a 48° C. heat distortion temperature at 66 p.s.i.

*Example 20*

Two parts of the reaction product prepared by the method of Example 6 (20% by weight free methacrylic acid) and 1 part vinylidene chloride were polymerized isothermally for 7 hours at 25° C. using 1% by weight benzoyl peroxide and 0.1% by weight dimethyl aniline as the catalyst. The copolymer had a Clash-Berg $T_4$ of 38° C.

*Example 21*

One hundred and twenty parts of the reaction product prepared by the method of Example 6 (20% by weight free methacrylic acid) and 60 parts diallyl phthalate were polymerized at 250° F. for 3 hours using 1.8 parts dicumyl peroxide and 0.9 part tertiary butyl perbenzoate as the catalyst. The copolymer had a flexular strength of 5,720 p.s.i. a flexular modulus of 142,000 p.s.i. a tensile strength of 3,970 p.s.i. a tensile modulus of 167,000 p.s.i., and an elongation of 11%.

*Example 22*

A series of compositions were sprayed upon panels and allowed to air cure at room temperature (85° F.) for 48 hours. Each of these compositions contained 200 parts of the reaction product prepared by the method of Example 6 (20% by weight free methacrylic acid), 100 parts styrene, 3 parts methyl ethyl ketone peroxide, 3 parts cobalt naphthenate, and 9 parts of one of the following: (A) bicyclo(2-2-1) heptene-3-carboxyaldehyde, (B) ditetrahydrofurfuryl fumarate, (C) 2-allyloxyethyl acrylate, (D) cyclohexyl methacrylate, and (E) linseed oil. Composition (A) was essentially tack free in about 6 hours and composition (E) was only slightly poorer in its air drying properties. The remaining compositions polymerized to somewhat tacky coatings.

*Example 23*

A composition comprising 33 parts of the reaction product prepared by the method of Example 6 (20% by weight free methacrylic acid), 17 parts styrene, 2.5 parts linseed oil, 0.5 part methyl ethyl ketone peroxide, and 0.5 part cobalt naphthenate was coated on a glass substrate. The coating was relatively tack free after drying overnight.

*Example 24*

Seventy-seven parts of maleic anhydride was dissolved in 167 parts of styrene at 120° F. and the resultant mixture was added to 257 parts of the reaction product prepared by the method of Example 6 (20% by weight free methacrylic acid). This composition was polymerized at 60° C. after the addition of 5 parts methyl ethyl ketone peroxide and 1 part cobalt naphthenate. The resultant copolymer was opaque and gave the appearance that it contained a filler.

*Example 25*

One hundred and thirty-four parts of the reaction product prepared by the method of Example 6 (20% by weight free methacrylic acid), 66 parts styrene, and 10 parts dibromostyrene gelled at room temperature after the addition of 2 parts benzoyl peroxide and 0.4 part dimethylaniline. The gelled product was then cured at 150° F.

*Examples 26–41*

A series of vicinal methacryloxy-hydroxy substituted soybean oil products was prepared by the method of Example 6, varying the mole ratio of methacrylic acid to equivalents of oxirane oxygen in the fully epoxidized soybean oil as set forth in Table III below. The concentration of methacrylic acid in the reaction product was then adjusted as indicated in Table III and the composition was diluted with styrene as also indicated. All of the polymerizable compositions were polymerized at 60° C. for 16 hours using 1% by weight benzoyl peroxide.

TABLE III

| Example | Ratio of Moles of Methacrylic Acid to Equivalents of Oxirane Oxygen | Wt. Percent of Residual Methacrylic Acid | Wt. Percent Methacrylic Acid After Addition of Styrene and/or Addition of Methacrylic Acid | Wt. Percent of Styrene | Barcol Hardness, ° C. | Clash-Berg $T_4$, ° C. | Heat Distortion, ° C. at 66 p.s.i. |
|---|---|---|---|---|---|---|---|
| 26 | 0.5 | 3.4 | 2.3 | 33 | 20 | 36 | 35 |
| 27 | 0.5 | 3.4 | 13.3 | 33 | 61 | 65 | 58 |
| 28 | 0.5 | 3.4 | 10.0 | 50 | 70 | 68 | 62 |
| 29 | 0.5 | 3.4 | 10.0 | 0 | 0 | 25 | 61 |
| 30 | 0.5 | 3.4 | 27.1 | 25 | 84 | 122 | 125 |
| 31 | 1.0 | 10.0 | 7.7 | 33 | 65 | 76 | 65 |
| 32 | 1.0 | 10.0 | 10.0 | 0 | 40 | 79 | 57 |
| 33 | 1.0 | 10.0 | 13.3 | 33 | 74 | 93 | 80 |
| 34 | 1.0 | 10.0 | 10.0 | 50 | 75 | 90 | 82 |
| 35 | 1.0 | 10.0 | 20.0 | 0 | 64 | 136 | 97 |
| 36 | 1.0 | 10.0 | 30.6 | 25 | 85 | 142 | 107 |
| 37 | 1.5 | 18.5 | 12.3 | 33 | 74 | 102 | 82 |
| 38 | 1.5 | 18.5 | 9.2 | 50 | 74 | 86 | 77 |
| 39 | 1.5 | 18.5 | 13.3 | 33 | 73 | 97 | 85 |
| 40 | 1.5 | 18.5 | 10.0 | 50 | 73 | 94 | 86 |
| 41 | 1.5 | 18.5 | 34.2 | 25 | 83 | 153 | 130 |

The above examples indicate that raising the methacrylic acid content in the copolymer increases the hardness, the softening temperature, and the heat distortion temperature point of the copolymer. It also indicates the embrittling and hardening effect of the monovinyl aromatic monomer in the copolymer.

*Example 42*

Twenty-five parts of the vicinal hydroxy-methacryloxy long-chain aliphatic reaction product prepared by the method of Example 6 (containing 5 parts methacrylic acid) and 975 parts styrene were polymerized at 65° C. for 16 hours using 10 parts benzoyl peroxide and then post-cured at 120° C. for 0.75 hour. The copolymer was a water-clear, very hard, rigid, tough solid.

*Example 43*

Eighty parts of the vicinal hydroxy-methacryloxy long-chain aliphatic reaction product prepared by the method of Example 6 (containing 20% by weight methacrylic acid) and 920 parts of styrene were polymerized at 65° C. for 16 hours using 10 parts benzoyl peroxide and then post-cured at 120° C. for 0.75 hour. The copolymer was a clear, hard, rigid, tough solid.

Since many embodiments of this invention may be made and since many changes may be made in the embodiments described, the foregoing is to be interpreted as illustrative only and my invention is defined by the claims appended hereafter.

I claim:
1. An addition polymerizable composition comprising from 2 to 98 parts by weight of a long chain fatty compound having an aliphatic chain of from 10 to 24 carbon atoms, said aliphatic chain of from 10 to 24 carbon atoms having internal vicinal acryloxy and hydroxy substituents, and said acryloxy substituent having attached to the alpha carbon atom thereof a member selected from the group consisting of hydrogen, alkyl of from 1 to 4 carbon atoms, halogen, benzyl, phenyl, cyano, and

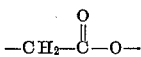

alkyl, and from 98 to 2 parts by weight of another copolymerizable ethylenically unsaturated monomer.

2. An addition polymerizable composition comprising from 2 to 98 parts by weight of a long chain fatty acid ester having an esterified aliphatic fatty acid chain of from 10 to 24 carbon atoms, said aliphatic fatty acid chain having internal vicinal acryloxy and hydroxy substituents, and said acryloxy substituent having attached to the alpha carbon atom thereof a member selected from the group consisting of hydrogen, alkyl of from 1 to 4 carbon atoms, halogen, benzyl, phenyl, cyano, and

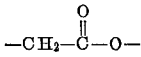

alkyl, and from 98 to 2 parts by weight of another copolymerizable ethylenically unsaturated monomer.

3. The polymerizable composition of claim 2, wherein said ethylenically unsaturated monomer comprises at least one vinylidene monomer selected from the group consisting of styrene, vinyl toluene, methyl methacrylate, methacrylic acid, and acrylic acid.

4. The polymerizable composition of claim 3, wherein said acryloxy group has the structure

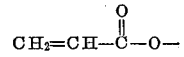

5. The polymerizable composition of claim 3, wherein said acryloxy group has the structure

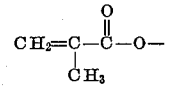

6. The polymerizable composition of claim 3, wherein said acryloxy group has the structure

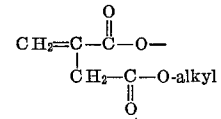

7. The polymerizable composition of claim 2, wherein said long chain fatty acid ester is a glyceride oil.

8. The polymerizable composition of claim 2, wherein said long chain fatty acid ester is a tall oil fatty acid ester.

9. An addition polymerizable composition comprising from 30 to 80 parts by weight of a glyceride oil having an esterified aliphatic fatty acid chain of from 10 to 24 carbon atoms, said aliphatic fatty acid chain having internal vicinal acryloxy and hydroxy substituents, and said acryloxy substituent having attached to the alpha carbon atom thereof a member selected from the group consisting of hydrogen, alkyl of from 1 to 4 carbon atoms, halogen, benzyl, phenyl, cyano, and

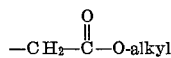

and from 70 to 20 parts by weight of a vinylidene monomer.

10. The polymerizable composition of claim 9 wherein said vinylidene monomer comprises at least one compound selected from the group consisting of styrene, vinyl toluene, methyl methacrylate, methacrylic acid, and acrylic acid.

11. An addition polymerizable composition comprising from 2 to 30 parts by weight of an acid acrylic compound having the structure

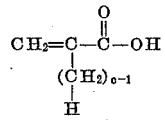

wherein $c$ is a number from 1 to 2; from 10 to 70 parts by weight of a monovinyl aromatic compound having the structure

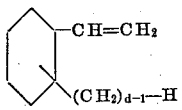

wherein $d$ is a number from 1 to 2; and from 30 to 80 parts by weight of a glyceride oil having an esterified aliphatic fatty acid chain of from 10 to 24 carbon atoms, said aliphatic fatty acid chain having internal vicinal acryloxy and hydroxy substituents, and said acryloxy substituent having the structure

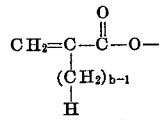

wherein $b$ is a number from 1 to 2.

12. The addition polymer formed by the free radical polymerization of the composition of claim 1.

13. The addition polymer formed by the free radical polymerization of the composition of claim 2.

13. The addition polymer formed by the free radical polymerization of the composition of claim 2.

14. The addition polymer formed by the free radical polymerization of the composition of claim 3.

15. The addition polymer formed by the free radical polymerization of the composition of claim 4.

16. The addition polymer formed by the free radical polymerization of the composition of claim 5.

17. The addition polymer formed by the free radical polymerization of the composition of claim 6.

18. The addition polymer formed by the free radical polymerization of claim 7.

19. The addition polymer formed by the free radical polymerization of the composition of claim 8.

20. The addition polymer formed by the free radical polymerization of the composition of claim 9.

21. The addition polymer formed by the free radical polymerization of the composition of claim 10.

22. The addition polymer formed by the free radical polymerization of the composition of claim 11.

References Cited by the Examiner

UNITED STATES PATENTS

| | | | |
|---|---|---|---|
| 2,129,694 | 9/1938 | Izard | 260—89.5 XR |
| 2,129,722 | 9/1938 | Woodhouse | 260—89.5 XR |
| 2,141,546 | 12/1938 | Strain | 260—23 |
| 2,728,781 | 12/1955 | Shokal et al. | 260—18 |

LEON J. BERCOVITZ, *Primary Examiner.*

T. D. ERWIN, R. A. WHITE, *Assistant Examiners.*

UNITED STATES PATENT OFFICE
CERTIFICATE OF CORRECTION

Patent No. 3,256,225　　　　　　　　　　　　　　June 14, 1966

Charles S. Nevin

It is hereby certified that error appears in the above numbered patent requiring correction and that the said Letters Patent should read as corrected below.

Column 2, line 59, for "hydrovydecane" read -- hydroxydecane --; column 5, line 44, for "may" read -- my --; column 6, line 37, for "25%" read -- 20% --; column 7, line 44, for "epoxized" read -- epoxidized --; column 8, line 5, for "0.027" read -- 0.025% --; columns 11 and 12, TABLE III, in the heading to the second column, line 1 thereof, for "Moloes" read -- Moles --; column 11, lines 60 and 75, the formula, each occurrence, should appear as shown below instead of as in the patent:

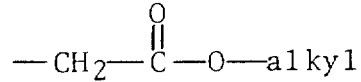

same column 11, line 62, and column 12, line 1, strike out "alkyl", each occurrence; column 13, lines 25 and 26, strike out "13. The addition polymer formed by the free radical polymerization of the composition of claim 2."; column 14, line 8, for "polymerization of claim 7." read -- polymerization of the composition of claim 7. --.

Signed and sealed this 7th day of November 1967.

(SEAL)
Attest:

EDWARD M. FLETCHER, JR.　　　　　　　　　　EDWARD J. BRENNER
Attesting Officer　　　　　　　　　　　　Commissioner of Patents